United States Patent
Golan et al.

(10) Patent No.: US 9,311,541 B2
(45) Date of Patent: *Apr. 12, 2016

(54) SYSTEMS AND METHODS FOR MULTI-PASS ADAPTIVE PEOPLE COUNTING

(71) Applicant: Verint Systems Ltd., Herzilya Pituach (IL)

(72) Inventors: Oren Golan, Or-Yehuda (IL); Ofer Steinmetz, Tel Aviv (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,182

(22) Filed: Aug. 28, 2014

(65) Prior Publication Data

US 2014/0369565 A1    Dec. 18, 2014

Related U.S. Application Data

(63) Continuation of application No. 14/193,834, filed on Feb. 28, 2014, which is a continuation of application No. 13/567,730, filed on Aug. 6, 2012, now Pat. No. 8,705,798, which is a continuation of application No. 12/048,674, filed on Mar. 14, 2008, now Pat. No. 8,238,603.

(51) Int. Cl.
*G06K 9/00* (2006.01)

(52) U.S. Cl.
CPC ................... *G06K 9/00778* (2013.01)

(58) Field of Classification Search
CPC . G06K 9/00778; G06K 9/32; G06K 9/00228; G06K 9/00362; G06K 9/00771; G06K 9/00369; G06T 2207/30241; G06T 7/2033; G06T 2207/30196; G06T 2207/30242; G06T 7/0081; G06T 7/20; G07C 9/00
USPC ........................................................ 382/103
See application file for complete search history.

(56) References Cited

U.S. PATENT DOCUMENTS

| | | | |
|---|---|---|---|
| 7,139,409 B2 | 11/2006 | Paragios et al. | |
| 7,409,076 B2 | 8/2008 | Brown et al. | |
| 7,529,388 B2 * | 5/2009 | Brown et al. | ................. 382/103 |
| 2006/0067456 A1 | 3/2006 | Ku et al. | |
| 2008/0118106 A1 * | 5/2008 | Kilambi et al. | ............... 382/103 |

OTHER PUBLICATIONS

Anup Doshi, "People Counting and Tracking for Surveillance," CSE 252C Project Report, Nov. 29, 2005, 5 pages.

* cited by examiner

*Primary Examiner* — Tom Y Lu
(74) *Attorney, Agent, or Firm* — Meunier Carlin & Curfman

(57) ABSTRACT

People are counted in a segment of video with a video processing system that is configured with a first set of parameters. This produces a first output. Based on this first output, a second set of parameters is chosen. People are then counted in the segment of video using the second set of parameters. This produces a second output. People are counted with a video played forward. People are counted with a video played backwards. The results of these two counts are reconciled to produce a more accurate people count.

3 Claims, 5 Drawing Sheets

SYSTEMS AND METHODS FOR MULTI-PASS ADAPTIVE PEOPLE COUNTING

CROSS-REFERENCE TO RELATED APPLICATIONS

This application is a continuation of U.S. application Ser. No. 14/193,834, filed Feb. 28, 2014, which application was published on Jun. 26 2014, as U.S. Publication No. 20140177919, and further is a continuation of U.S. application Ser. No, 13/567,730, filed Aug. 6, 2012, which application was published on Nov. 29, 2012, as U.S. Publication No. 20120300983, and further is a continuation of U.S. application Ser. No. 12/048,674, filed Mar. 14, 2008, which application was published on Nov. 29, 2012, as U.S. Publication No. 20120300983, and granted as U.S. Pat. No. 8,238,603 on Aug. 7, 2012, the contents of which are incorporated herein by reference in their entireties.

TECHNICAL FIELD

This invention is related to video processing. In particular, this invention is related to counting people in a video.

TECHNICAL BACKGROUND

Video analytics (a.k.a. machine vision) is a technology that is used to analyze video for specific data, behavior, objects or attitude. Video signals are input to a computer where the images they represent may be analyzed. Software algorithms run on these computers to mimic the human and understanding of a sequence of images. Video analytics can evaluate the contents of video to determine specified information about the content of that video. One of the applications of video analytics is counting people.

Counting people using video equipment and computers is a tool that has many uses. These uses include improving safety, security, and making logistical and operational business decisions. For example, counting the number of people who exit each particular door during a fire drill may help safety planners improve exit signage. In another example, counting the number of people entering a shopping mall may allow store managers to detect an unusually busy day and call in extra staff.

TECHNICAL SUMMARY

Methods of counting people in a video using multiple passes is disclosed. In an embodiment, people are counted in a segment of video with a video processing system that is configured with a first set of parameters. This produces a first output. Based on this first output, a second set of parameters is chosen. People are then counted in the segment of video using the second set of parameters. This produces a second output.

The first output may be a people count. The people count may determine the congestion of a scene. The second set of parameters may be chosen from sets of parameters that include sets of parameters optimized for low congestion scenes, high congestion scenes, and standard congestion scenes.

The first output may correspond to an active area in the video. The second set of parameters may limit the counting of people to the active area.

The first output may correspond to an active segment of the video. The second set of parameters may limit the counting of people to the active segment of the video.

In an embodiment, people are counted in a segment of video played in a first direction using a video processing system configured with a first set of parameters. This produces a first output. People are counted with the video played in a second direction using a second set of parameters. This produces a second output. Based on these two outputs, a third set of parameters is chosen. People are counted in the video played in the first direction using the third set of parameters. This to produces a third output. People are counted in the video played in the second direction using the third set of parameters. This produces a fourth output. The third and fourth outputs are reconciled to produce a fifth output.

The third output may be a first set of trajectories. The fourth output may be second set of trajectories. The first and second set of trajectories may be compared to produce a third set of trajectories. A people count may be determined from the third set of trajectories.

The third set of parameters may be chosen based on the first and second outputs. The third set of parameters may be chosen from sets of parameters are optimized for low congestion scenes, high congestion scenes, and standard congestion scenes.

Multi-pass video people counting systems are disclosed. In an embodiment, a video processing system configured with a first set of parameters counts people in a segment of video and produces a first output. The video processing system determines a second set of parameters based on at least the first output. The video processing system is reconfigured with the second set of parameters and counts people in the segment of video to produce a second output. The second set of parameters may be chosen from parameters that are optimized for low congestion scenes, high congestion scenes, and standard congestion scenes.

The first output may correspond to an active area in the video. The second set of parameters may limit the counting of people to the active area. The first output may correspond to an active segment of the video. The second set of parameters may limit the counting of people to the active segment of the video.

In an embodiment, a video processing system configured with a first set of parameters counts people in a segment of video played in a first direction to produce a first output. The video processing system is configured with a second set of parameters and counts people in the video played in a second direction to produce a second output. The video processing system determines a third set of parameters based on the first and second outputs. The video processing system counts people in the segment of video played in the first direction using the third set of parameters to produce a third output. The video processing system counts people in the segment of video played in the second direction using the third set of parameters to produce a fourth output. The video processing system reconciles the third and fourth outputs to produce a fifth output.

The third output may be a first set of trajectories. The fourth output may be second set of trajectories. The first and second set of trajectories may be compared to produce a third set of trajectories. A people count may be determined from the third set of trajectories.

The third set of parameters may chosen based on the first and second outputs. The third set of parameters may be chosen from sets of parameters are optimized for low congestion scenes, high congestion scenes, and standard congestion scenes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
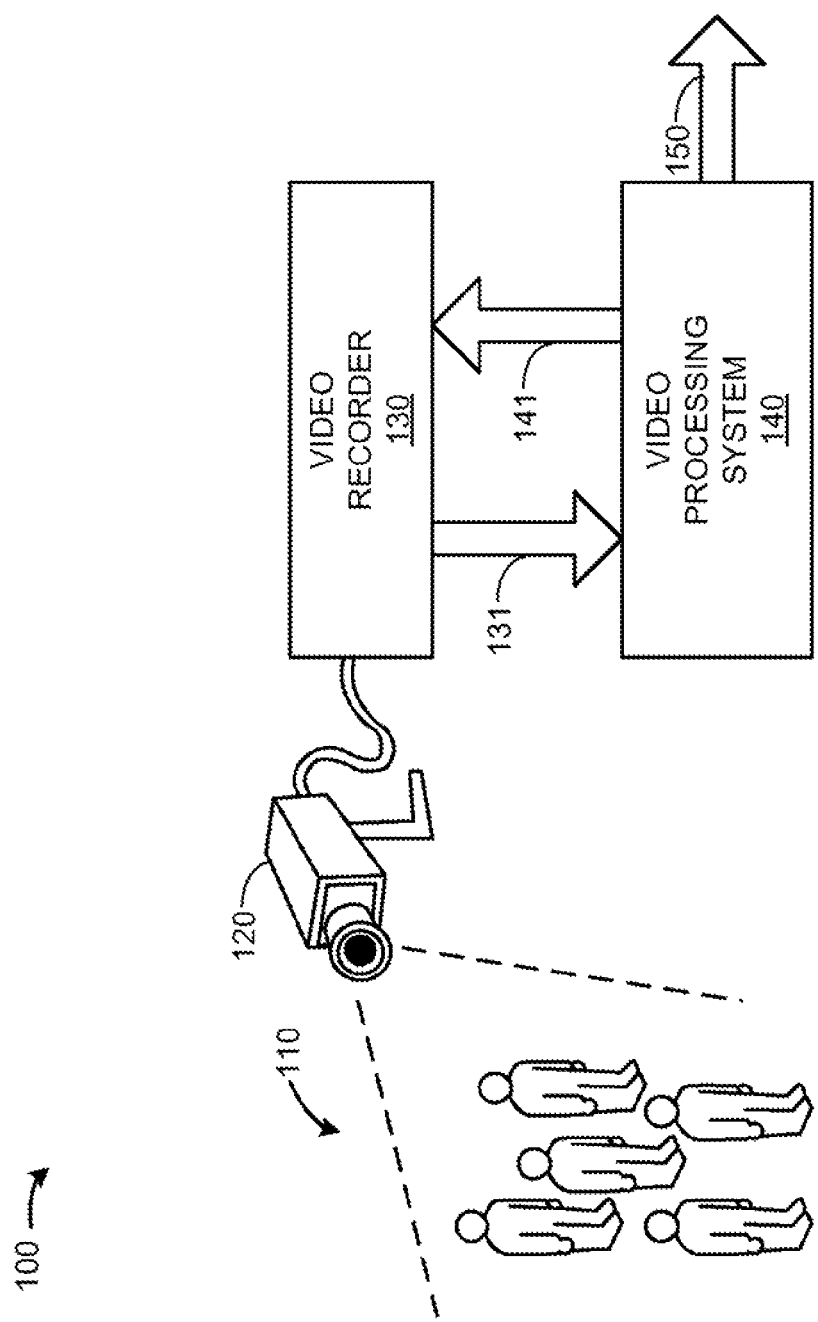
FIG. 1 is a block diagram illustrating a multi-pass video people counting system.

FIG. 1 is a block diagram illustrating a multi-pass video people counting system. Video people counting system 100 comprises video source 120; video recorder 130; and video processing system 140. Video source 120 supplies video images of people 110 to video recorder 130. Video source 120 is operatively coupled to video recorder 130. Video recorder 130 supplies video segments 131 to video processing system 140. Video processing system 141 supplies control signals 141 to video recorder 130. Video processing system 140 produces an output 150. Output 150 may be a count of people 110.

In an embodiment, video source 120 supplies video recorder 130 with a video of people 110. Typically, people 110 move into, around, and out of video source 120's field of view. This motion is recorded by video recorder 130 as a sequence of video frames or fields. Sequences of video frames or fields may be played back by video recorder 130 as segments of video 131. Segments of video 131 may be sent to video processing system 140. Video processing system 140 may send commands to video recorder 130 via control signals 141 that cause video recorder 130 to send recorded segments of video 131 to video processing system 140.

In an embodiment, video processing system 140 is configured with a first set of parameters. These parameters (or any other sets of parameters described herein) affect the algorithms and the choice of algorithms used to count people in a segment of video. For example, the sets of parameters may include, but are not limited to: head matching shape set; head matching shape algorithm, threshold probabilities that define when a shape is classified as person; a repelling function that affects when multiple heads are detected as a single head; trajectory detecting algorithm; threshold trajectory lengths that affects when a trajectory is counted as a person; head tracking shape set; weighting functions that affect the frame-by-frame tracking of trajectories; weighting algorithm, an active area of video; active area detecting algorithm; active video detecting algorithm; and, an active set of video frames.

The video processing system 140 uses these parameters to count the people in a segment of video 131. This produces a first output. In an embodiment, this first output may be a number corresponding to the people counted in the segment of video 131. In an embodiment, the first output may be a set of trajectories corresponding to the paths of objects that the video processing system 140 has classified as people in the segment of video 131.

The first output is used to determine a second set of parameters. For example, a people count that exceeds a threshold value may indicate that the segment of video 131 is congested. If a scene is congested, using a particular second set of parameters may result in a more accurate count than using the first set of parameters. Likewise, if a scene is nearly empty of people (i.e., lightly congested), a different second set of parameters may result in a more accurate count than using the first set of parameters. In another example, if a scene has an average number of people (i.e., standard congestion), yet another second set of parameters may result in a more accurate count than using the first set of parameters. The parameters that are chosen for the second set of parameters are determined by the first output to better match parameters that are optimized for the conditions in the segment of video 131.

The second set of parameters may include individual parameters that are the same as the first set. However, at least one individual parameter should be different between the first set and the second set.

In an embodiment, the trajectories of the first output are analyzed to determine the second set of parameters. For example, a threshold number of trajectories in the first output may cross each other. This may indicate that a second set of parameters that are better at counting people with crossing paths would yield a more accurate count.

The video processing system 140 uses the second set of parameters to count the people in a segment of video 131. This produces a second output. In an embodiment, the second output may be a number corresponding to the people counted in the segment of video 131. In an embodiment, the second output may be a set of trajectories corresponding to the paths of objects that the video processing system 140 has classified as people in the segment of video 131.

In an embodiment, the first output may correspond to an active area in the video. For example, only part of video source 120's field of view may contain people and that may only be during part of the segment of video 131. An example of this would be counting people through doors that open and close. When the doors are closed, there are no people to count. When the doors are open, only the area containing the view through the doors will contain people to count. Accordingly, the chosen second set of parameters may limit the counting of people to the active area. Another option is to choose the second set of parameters so that they limit the counting of people to the active segment of the video (e.g., when the doors are open).

In an embodiment, video processing system 140 counts people in a segment of video 131 played in a first direction. This first direction may be forward or backward. This produces a first output. In an embodiment, this first output may be a number corresponding to the people counted in the segment of video 131 when it was played in the first direction. In an embodiment, the first output may be a set of trajectories corresponding to the paths of objects that the video processing system 140 has classified as people in the segment of video 131 when it was played in the first direction.

People are then counted by the video processing system 140 in the segment of video 131 as it is played in a second direction that is the opposite of the first. This produces a second output. In an embodiment, this second output may be a number corresponding to the people counted in the segment of video 131 when it was played in the second direction. In an embodiment, the second output may be a set of trajectories corresponding to the paths of objects that the video processing system 140 has classified as people in the segment of video 131 when it was played in the second direction.

The first output and the second output are reconciled to produce a third output. For example, the third output may be the greater number between the first output and the second output.

In an embodiment, the first output and the second output are sets of trajectories. The video processing system 140 compares the first and second sets of trajectories to produce a third set of trajectories. A people count may be determined from the third set of trajectories.

The third set of trajectories may comprise the trajectories resulting from a union of the first and second set of trajectories. Because trajectories of the same person in the first set of trajectories and the second set of trajectories may not match exactly, members of the first and second sets of trajectories are considered equivalent for the purposes of the union if they meet an equivalence criteria. The equivalence criteria may include correlating two trajectories. If the correlation between two trajectories meets a threshold value, then the two trajectories may be considered equivalent for the purposes of the union operation. The number of trajectories in the third set of trajectories may be used as a people count.

In an embodiment, people are counted in a segment of video played in a first direction using video processing system 140 when it is configured with a first set of parameters. This produces a first output. In an embodiment, this first output may be a number corresponding to the people counted in the segment of video 131 by video processing system 140 when it was played in the first direction. In an embodiment, the first output may be a set of trajectories corresponding to the paths of objects that the video processing system 140 has classified as people in the segment of video 131 when it was played in the first direction.

People are counted by video processing system 140 when it is configured with a second set of parameters and the video is played in a second direction. This produces a second output. In an embodiment, this second output may be a number corresponding to the people counted in the segment of video 131 by video processing system 140 when it was played in the second direction. In an embodiment, the second output may be a set of trajectories corresponding to the paths of objects that the video processing system 140 has classified as people in the segment of video 131 when it was played in the second direction.

Based on the first and second outputs, a third set of parameters is chosen. For example, a people count that exceeds a threshold value may indicate that the segment of video 131 is congested. If a scene is congested, using a particular third set of parameters may result in a more accurate count than using either the first or second set of parameters. Likewise, if a scene is nearly empty of people (i.e., lightly congested), a different third set of parameters may result in a more accurate count than either the first or second set of parameters. In another example, if a scene has an average number of people (i.e., standard congestion), yet another third set of parameters may result in a more accurate count than using the first or second set of parameters. The parameters that are chosen for the third set of parameters are determined by the first and second outputs to better match the conditions in the segment of video 131.

In an embodiment, the trajectories of the first and second outputs are analyzed to determine the third set of parameters. For example, a threshold number of trajectories in the union of the first and second outputs may cross each other. This may indicate that a particular third set of parameters would yield a more accurate count.

The video processing system 140 counts people in the segment of video 131 played in the first direction using the third set of parameters. This produces a third output. In an embodiment, this third output may be a number corresponding to the people counted in the segment of video 131 when it was played in the first direction and the third set of parameters was used. In an embodiment, the first output may be a set of trajectories corresponding to the paths of objects that the video processing system 140 has classified as people in the segment of video 131 when it was played in the first direction and the third set of parameters were used.

The video processing system 140 counts people in the segment of video 131 played in the second direction using the third set of parameters. This produces a fourth output. In an embodiment, this fourth output may be a number corresponding to the people counted in the segment of video 131 when it was played in the second direction and the third set of parameters was used. In an embodiment, the fourth output may be a set of trajectories corresponding to the paths of objects that the video processing system 140 has classified as people in the segment of video 131 when it was played in the second direction and the third set of parameters was used.

The third and fourth outputs are reconciled to produce a fifth output. For example, the fifth output may be the greater number between the third output and the fourth output.

In an embodiment, the third output and the fourth output are sets of trajectories. The video processing system 140 compares the third and fourth sets of trajectories to produce a fifth set of trajectories. A people count may be determined from the fifth set of trajectories.

The fifth set of trajectories may comprise the trajectories resulting from a union of the third and fourth set of trajectories. Because trajectories of the same person in the third set of trajectories and the fourth set of trajectories may not match exactly, members of the third and fourth sets of trajectories are considered equivalent for the purposes of the union if they meet an equivalence criteria. The equivalence criteria may include correlating two trajectories. If the correlation between two trajectories meets a threshold value, then the two trajectories may be considered equivalent for the purposes of the union operation. The number of trajectories in the fifth set of trajectories may be used as a people count.

The third set of parameters may chosen based on the first and second outputs. The third set of parameters may be chosen from sets of parameters are optimized for low congestion scenes, high congestion scenes, and standard congestion scenes.

Figure 2:
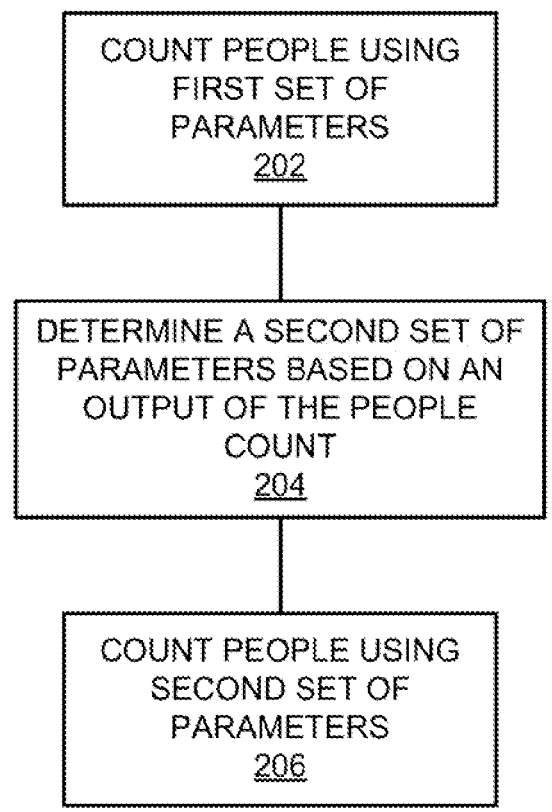
FIG. 2 is a flowchart illustrating a multi-pass method of counting people in a video.

FIG. 2 is a flowchart illustrating a multi-pass method of counting people in a video. The method shown in FIG. 2 may be performed by video people counting system 100 or video processing system 140. The steps shown in FIG. 2 are indicated parenthetically in the following discussion. People are counted in a video sequence using a first set of parameters (202). These first set of parameters affect the algorithms used to count people in the video sequence. In an embodiment, an output of the first people count may be a number corresponding to the people counted in the video sequence. In an embodiment, an output of the first people count may be a set of trajectories corresponding to the paths of objects that were classified as people in the video sequence.

The first set of parameters (or any other sets of parameters described herein) may include or affect, but are not limited to: head matching shape set; head matching shape algorithm; threshold probabilities that define when a shape is classified as person; a repelling function that affects when multiple heads are detected as a single head; trajectory detecting algorithm; threshold trajectory lengths that affects when a trajectory is counted as a person; head tracking shape set; weighting functions that affect the frame-by-frame tracking of trajectories; weighting algorithm, an active area of video; active area detecting algorithm; active video detecting algorithm; and, an active set of video frames. It should be understood that the sets of parameters described herein include the algorithms used to count people in the video.

A second set of parameters is determined based on an output of the people count in step 202 (204). The second set of parameters may include individual parameters that are the same as the first set. However, at least one individual parameter should be different between the first set and the second set. An output of the first people count is used to determine a second set of parameters. For example, a first people count that exceeds a threshold value may indicate that the video sequence is congested. If a video sequence is congested, using a particular second set of parameters may result in a more accurate count than using the first set of parameters Likewise, if a video sequence is nearly empty of people (i.e., lightly congested), a different second set of parameters may result in a more accurate count than using the first set of parameters. In another example, if a video sequence has an average number of people (i.e., standard congestion), yet another second set of parameters may result in a more accurate count than using the first set of parameters. The parameters that are chosen for the second set of parameters are determined by an output of the people count to better match the conditions in the video sequence.

In an embodiment, the trajectories of a first output of the people count are analyzed to determine the second set of parameters. For example, a threshold number of trajectories in the first output of the people count may cross each other. This may indicate that a second set of parameters that are better at counting people with crossing paths would yield a more accurate count should be used.

People are counted in a video sequence using the second set of parameters (206). In an embodiment, the result of the second people count that may be a number corresponding to the people counted in the video sequence. In an embodiment, the result of the second people count may be a set of trajectories corresponding to the paths of objects that were classified as people in the video sequence.

In an embodiment, the output of the first people count may correspond to an active area in the video. For example, only part of video source 120's field of view may contain people and that may only be during part of the segment of video 131. An example of this would be counting people through doors that open and close. When the doors are closed, there are no people to count. When the doors are open, only the area containing the view through the doors will contain people to count. Accordingly, the chosen second set of parameters may limit the counting of people to the active area. Another option is to choose the second set of parameters so they limit the counting of people to the active segment of the video (e.g., when the doors are open).

Figure 3:
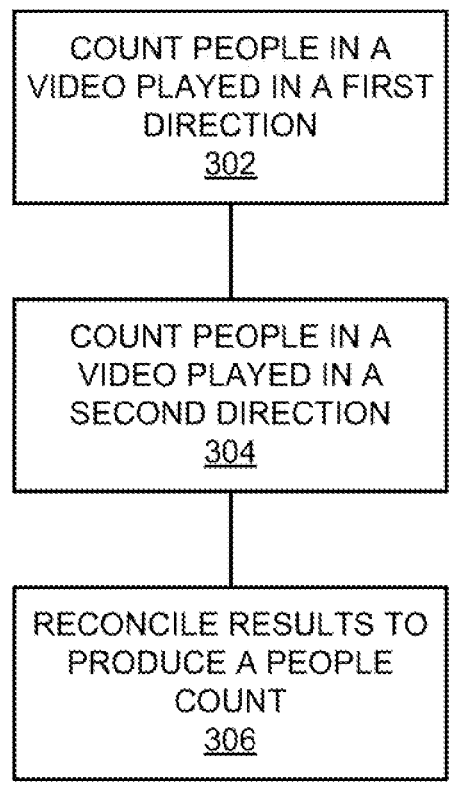
FIG. 3 is a flowchart illustrating a multi-pass method of counting people in a video.

FIG. 3 is a flowchart illustrating a multi-pass method of counting people in a video. The method shown in FIG. 3 may be performed by video people counting system 100 or video processing system 140. The steps shown in FIG. 3 are indicated parenthetically in the following discussion. People are counted in a video sequence as it is played in a first direction (302). This first direction may be forward or backward. This first people count produces a first output. In an embodiment, this first output may be a number corresponding to the people counted in the video sequence when it was played in the first direction. In an embodiment, the first output may be a set of trajectories corresponding to the paths of objects that were classified as people in the video sequence as it was played in the first direction.

People are counted in a video sequence as it is played in a second direction that is the opposite of the first (304). This second people count produces a second output. In an embodiment, this second output may be a number corresponding to the people counted in the video sequence as it was played in the second direction. In an embodiment, the second output may be a set of trajectories corresponding to the paths of objects that were classified as people in the video sequence as it was played in the second direction.

The results (e.g., the first output and the second output) are reconciled to produce a people count (306). For example, the people count may be the greater number between the first output and the second output.

In an embodiment, the first output and the second output are sets of trajectories. The first and second sets of trajectories are compared to produce a third set of trajectories. A people count may be determined from the third set of trajectories.

The third set of trajectories may comprise the trajectories resulting from a union of the first and second set of trajectories. Because trajectories of the same person in the first set of trajectories and the second set of trajectories may not match exactly, members of the first and second sets of trajectories are considered equivalent for the purposes of the union if they meet an equivalence criteria. The equivalence criteria may include correlating two trajectories. If the correlation between two trajectories meets a threshold value, then the two trajectories may be considered equivalent for the purposes of the union operation. A number corresponding to the number of trajectories in the third set of trajectories may be used as a people count.

Figure 4:
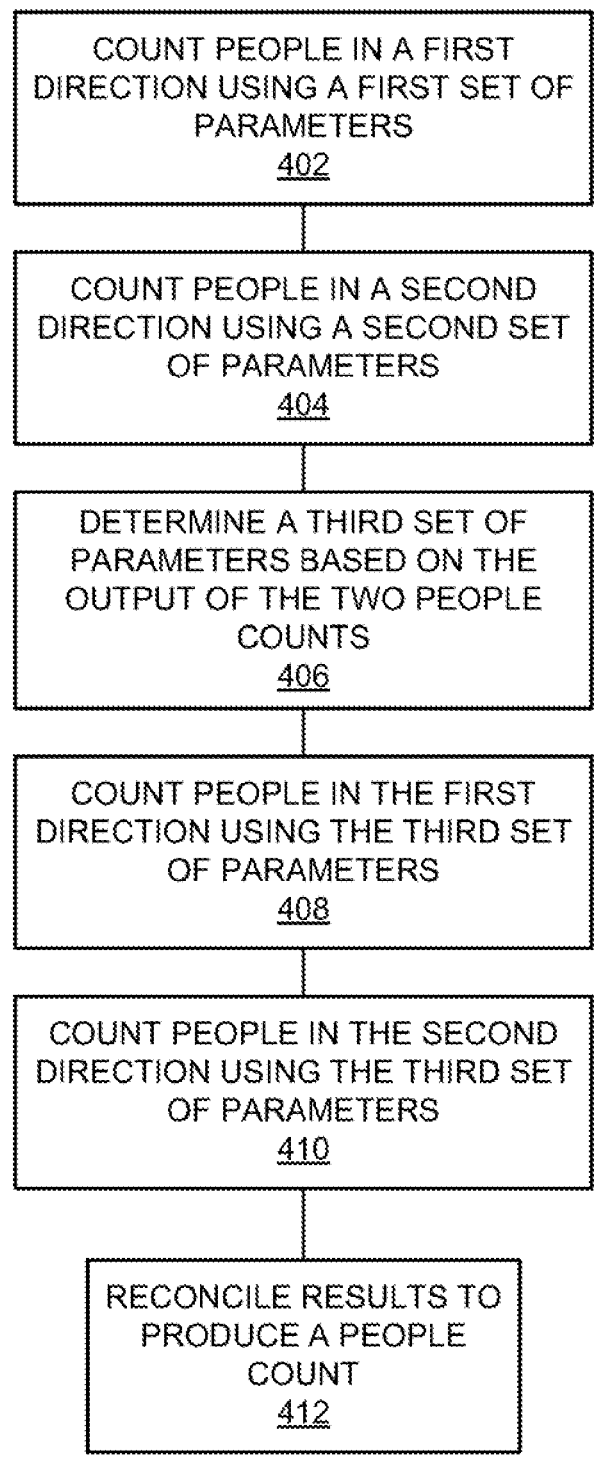
FIG. 4 is a flowchart illustrating a multi-pass method of counting people in a video; and, FIG. 5 is a block diagram of a computer system.

FIG. 4 is a flowchart illustrating a multi-pass method of counting people in a video. The method shown in FIG. 4 may be performed by video people counting system 100 or video processing system 140. The steps shown in FIG. 4 are indicated parenthetically in the following discussion. People are counted in a video sequence played in a first direction using a first set of parameters (402). This first direction may be forward or backward. This produces a first output. In an embodiment, this first output may be a number corresponding to the number people counted in the video sequence as it was played in the first direction. In an embodiment, the first output may be a set of trajectories corresponding to the paths of objects that were classified as people in the video sequence as it was played in the first direction.

People are counted in a video sequence played in a second direction using a first set of parameters (404). The second direction is the opposite of the first direction. This produces a second output. In an embodiment, this second output may be a number corresponding to the number people counted in the video sequence as it was played in the second direction. In an embodiment, the second output may be a set of trajectories corresponding to the paths of objects that were classified as people in the video sequence as it was played in the second direction.

Based on the output of the two people counts (e.g., the first and second outputs), a third set of parameters is determined (406). The third set of parameters may include individual parameters that are the same as the first or second set. However, at least one individual parameter should be different between the first and second sets when compared to the third set.

In an example, the first or second output may indicate a people count that exceeds a threshold value. This may indicate that the video sequence is congested. If a video sequence is congested, using a particular third set of parameters may result in a more accurate count than using either the first or second set of parameters. Likewise, if a video sequence is nearly empty of people (i.e., lightly congested), a different third set of parameters may result in a more accurate count than either the first or second set of parameters.

In another example, if a video sequence has an average number of people (i.e., standard congestion), yet another set of parameters may result in a more accurate count than using the first or second set of parameters. The parameters that are chosen for the third set of parameters are determined by the first and second outputs to better match the conditions in the video sequence.

In an embodiment, the trajectories of the first and second outputs are analyzed to determine the third set of parameters. For example, a threshold number of trajectories in the union of the first and second outputs may cross each other. This may indicate that a particular third set of parameters would yield a more accurate count.

The third set of parameters may be chosen based on the first and second outputs. The third set of parameters may be chosen from sets of parameters that are optimized for low congestion scenes, high congestion scenes, and standard congestion scenes.

People are counted in a video sequence played in a first direction using the third set of parameters (408). This first direction may be forward or backward. This produces a third output. In an embodiment, this third output may be a number corresponding to the number people counted in the video sequence as it was played in the first direction. In an embodiment, the third output may be a set of trajectories corresponding to the paths of objects that were classified as people in the video sequence as it was played in the first direction.

People are counted in a video sequence played in a second direction using a first set of parameters (410). The second direction is the opposite of the first direction.

This produces a fourth output. In an embodiment, this fourth output may be a number corresponding to the number people counted in the video sequence as it was played in the second direction. In an embodiment, the fourth output may be a set of trajectories corresponding to the paths of objects that were classified as people in the video sequence as it was played in the second direction.

The third and fourth outputs are reconciled to produce a fifth output (412). For example, the fifth output may be the greater number between the third output and the fourth output.

In an embodiment, the third output and the fourth output are sets of trajectories. The third and fourth outputs are compared a fifth set of trajectories. A people count may be determined from the fifth set of trajectories.

The fifth set of trajectories may comprise the trajectories resulting from a union of the third and fourth set of trajectories. Because trajectories of the same person in the third set of trajectories and the fourth set of trajectories may not match exactly, members of the third and fourth sets of trajectories are considered equivalent for the purposes of the union if they meet an equivalence criteria. The equivalence criteria may include correlating two trajectories. If the correlation between two trajectories meets a threshold value, then the two trajectories may be considered equivalent for the purposes of the union operation. The number of trajectories in the fifth set of trajectories may be used as a people count.

The methods, systems, video sources, video recorders, and, video processing systems described above may be implemented with, contain, or be executed by one or more computer systems. The methods described above may also be stored on a computer readable medium. Many of the elements of video people counting system 100 may be, comprise, or include computers systems. This includes, but is not limited to video source 120, video recorder 130, and video processing system 140.

Figure 5:
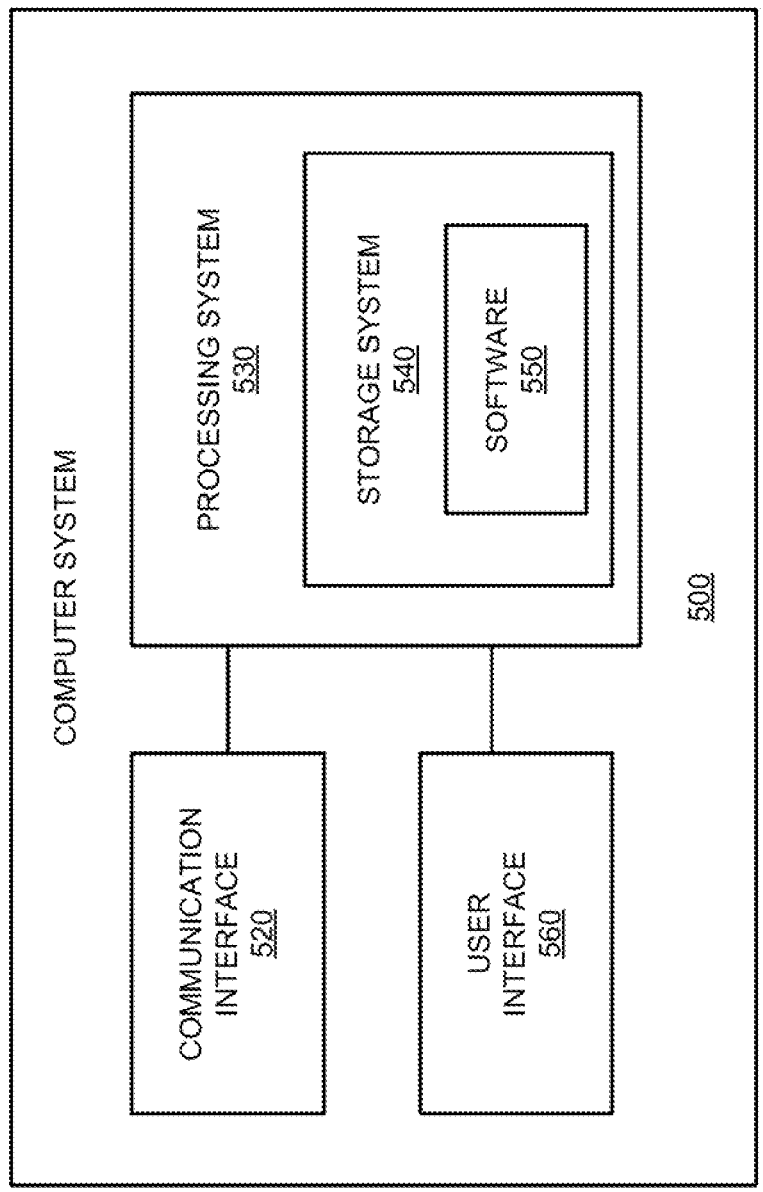

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein for many of the elements of video people counting system 100. This includes, but is not limited to video source 120, video recorder 130, and video processing system 140.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of counting people: in a video using multiple passes, comprising:
    counting people in a segment of video with a video processing system configured with a first set of parameters to produce a first output;

determining a second set of parameters based on at least the first output; and, counting people in the segment of video with the video processing system configured with the second set of parameters to produce a second output;

wherein the second set of parameters is chosen from a group of sets of parameters that include sets of parameters optimized for low congestion scenes, high congestion scenes, and standard congestion scenes.

2. The method of claim 1 wherein the first output is a people count.

3. The method of claim 2 wherein the people count determines a scene congestion factor.

* * * * *